US012807239B2

(12) United States Patent
Baxter et al.

(10) Patent No.: US 12,807,239 B2
(45) Date of Patent: *Nov. 24, 2026

(54) AERODYNAMIC SYSTEM FOR TRAILER WITH INTEGRALLY FORMED SKIRT AND RIB COVER

(71) Applicant: Trailer Aerodynamics LLC, Chicago, IL (US)

(72) Inventors: Parker Baxter, Greenville, SC (US); Justin Kane Morgan, Anderson, SC (US)

(73) Assignee: Trailer Aerodynamics LLC, Chicago, IL (US)

( * ) Notice: Subject to any disclaimer, the term of this patent is extended or adjusted under 35 U.S.C. 154(b) by 126 days.

This patent is subject to a terminal disclaimer.

(21) Appl. No.: 18/843,341

(22) PCT Filed: Feb. 24, 2023

(86) PCT No.: PCT/US2023/063277

§ 371 (c)(1), (2) Date: Sep. 3, 2024

(87) PCT Pub. No.: WO2023/168193

PCT Pub. Date: Sep. 7, 2023

(65) Prior Publication Data

US 2025/0178676 A1 Jun. 5, 2025

Related U.S. Application Data

(60) Provisional application No. 63/316,027, filed on Mar. 3, 2022.

(51) Int. Cl.
*B62D 35/00* (2006.01)

(52) U.S. Cl.
CPC .................................. *B62D 35/001* (2013.01)

(58) Field of Classification Search
CPC .... B62D 35/00; B62D 35/001; B62D 35/005; B62D 35/007; B62D 35/008; B62D 35/02
USPC ...................................................... 296/180.4
See application file for complete search history.

(56) References Cited

U.S. PATENT DOCUMENTS

| | | | |
|---|---|---|---|
| 8,292,351 | B2 | 10/2012 | Boivin et al. |
| 8,550,541 | B1 | 10/2013 | Kron |
| 8,672,390 | B1 | 3/2014 | Pfaff |
| 10,696,335 | B2 | 6/2020 | Macherel et al. |
| 12,459,582 | B2 | 11/2025 | Bradley |
| 12,576,924 | B2 | 3/2026 | Bradley |

(Continued)

OTHER PUBLICATIONS

International Search Report and Written Opinion for PCT/US2023/063277 issued Jun. 29, 2023; 12 pages.

(Continued)

*Primary Examiner* — Steven O Douglas
(74) *Attorney, Agent, or Firm* — Hansen Reynolds LLC

(57) ABSTRACT

An apparatus is provided that has a skirt that has an inner surface. A rib cover engages the skirt and is integrally formed with the skirt. The skirt has a height in a vertical direction that is taller than a height of the rib cover in the vertical direction. A bending member is present and is configured for being deflected from an at rest position upon application of force to the skirt. The bending member is configured for returning on its own to the at rest position upon the removal of the force from the skirt.

14 Claims, 12 Drawing Sheets

(56) References Cited

U.S. PATENT DOCUMENTS

| | | | | |
|---|---|---|---|---|
| 2010/0264690 | A1 | 10/2010 | Brown et al. | |
| 2011/0285167 | A1 * | 11/2011 | Butler | B62D 35/001 296/180.1 |
| 2012/0074728 | A1 * | 3/2012 | Senatro | B62D 35/001 296/180.4 |
| 2014/0072364 | A1 | 3/2014 | Mancina et al. | |
| 2016/0068202 | A1 | 3/2016 | Senatro | |
| 2019/0315414 | A9 | 10/2019 | Wiegel | |
| 2025/0083755 | A1 | 3/2025 | Morgan | |
| 2025/0171092 | A1 | 5/2025 | Morgan et al. | |
| 2025/0187681 | A1 | 6/2025 | Morgan et al. | |
| 2025/0196945 | A1 * | 6/2025 | Baxter | B62D 35/001 |

OTHER PUBLICATIONS

International Search Report and Written Opinion for PCT/US2023/063266 issued Jun. 26, 2023; 12 pages.

* cited by examiner

AERODYNAMIC SYSTEM FOR TRAILER WITH INTEGRALLY FORMED SKIRT AND RIB COVER

CROSS-REFERENCE TO RELATED APPLICATIONS

This application is a national phase entry under 35 U.S.C. § 371 of International Application No. PCT/US2023/063277, filed on Feb. 24, 2023, which claims priority to U.S. Provisional Patent Application No. 63/316,027 filed on Mar. 3, 2022. The contents of the above-referenced PCT application and the above-referenced United States Provisional Application are incorporated by reference herein in their entirety for all purposes.

FIELD OF THE INVENTION

The subject matter of the present invention relates to an apparatus that has an integrally formed skirt and rib cover for increasing aerodynamic performance of a trailer. More particularly, the present application involves a rib cover arrangement that aids in skirt positioning, functions as a structural member for the skirt, and acts as a bridge in the case of misaligned cross member beams.

BACKGROUND OF THE INVENTION

Trailers towed by trucks and similar vehicles for transporting cargo can be large, unwieldy, and include geometries which invite inefficiencies during travel. One aspect of these inefficiencies concerns the aerodynamics of the trailer. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced. The reduction in drag permits the trailer to be towed more efficiently, increasing the gas mileage and performance of the vehicle and its cargo. Trailer skirts should be rigid enough to not deform in their normal operating condition to appropriately deflect air and prevent drag on the moving trailer, however the skirt needs to exhibit some degree of flexibility because it is close to the ground and can hit curbs, snow, road debris, or other objects thus necessitating movement of the skirt to prevent the skirt from being detached or damaged.

It is known to provide support members attached to the trailer that engage and support the skirt. These support members themselves can flex to accommodate flexing of the skirt when the skirt strikes an object. Once the deflection force is removed the skirt and support member may spring back to their normal, at-rest positions. In the normal, at rest position the support member may have a face, the majority of which is parallel to the complimentary facing skirt face. The type of support member is a resilient vertical bifurcating beam and can be seen in U.S. Pat. No. 10,696,335 entitled Methods and Apparatus for Pivotally Mounting Trailer Skirt, owned by the Applicant of the present application, the contents of which are incorporated by reference herein in their entirety for all purposes.

The bottom of trailers also include I-beams that extend in the lateral direction and support or make up the floor of the trailer. These I-beams may be referred to as ribs, and present a varied surface that can be impacted by wind during transport and reduce the aerodynamic performance of the vehicle. In order to prevent this reduction in performance, rib covers can be positioned under the ribs to cover them so that airflow is desirably directed and aerodynamic performance is improved. However, current rib cover and skirt designs are provided in such a way that flutter occurs during travel, which is vibrations imparted onto these objects through wind contact and vehicle travel. These vibrations decrease the life and performance of the skirt and rib cover. Also, during assembly there is no way to easily position the skirt at a desired location on the trailer, especially when the skirt is angled relative to the longitudinal direction of the trailer. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
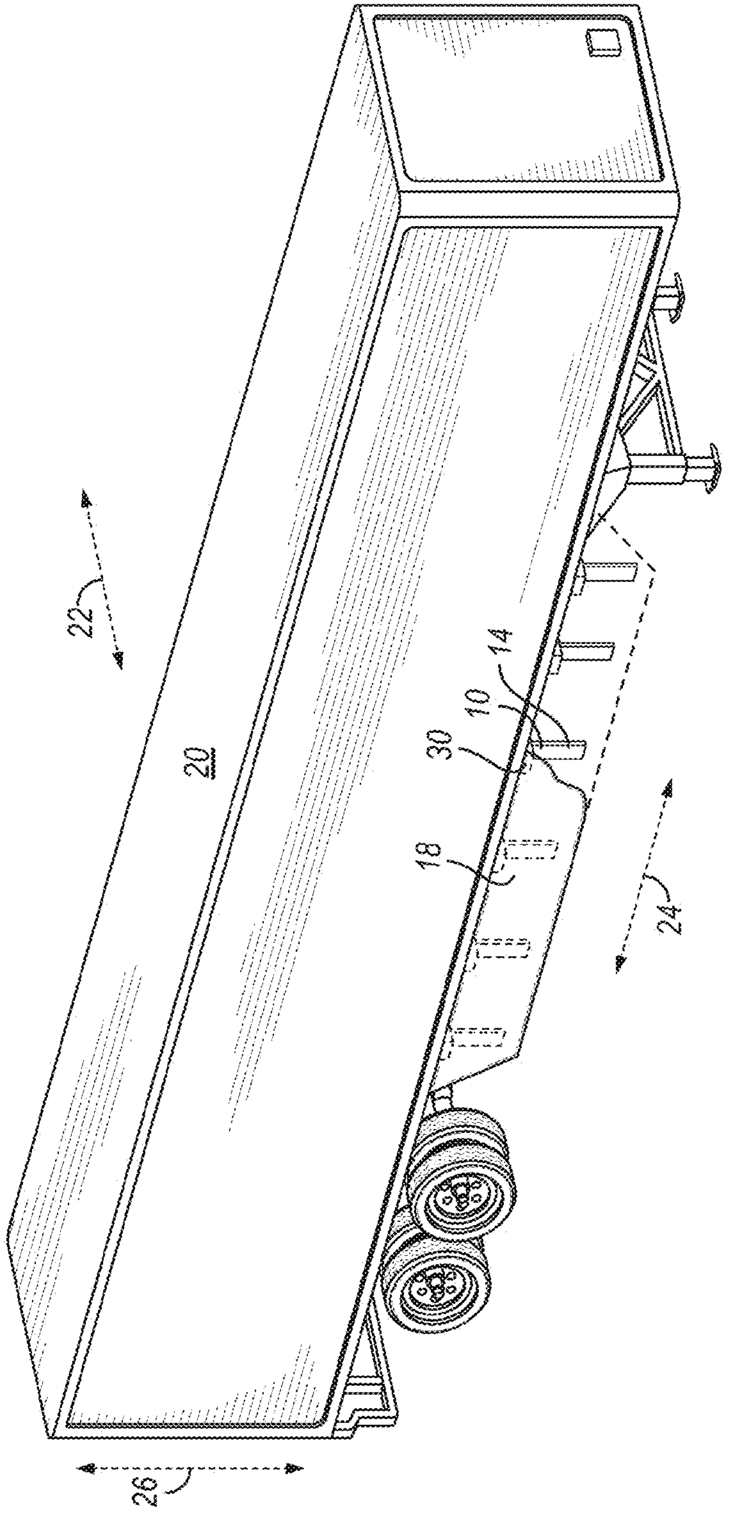
FIG. 1 is a perspective view of an aerodynamic trailer system attached to a trailer with a portion of the skirt shown in hidden lines for clarity.

Reference will now be made in detail to embodiments of the invention, one or more examples of which are illustrated in the drawings. Each example is provided by way of explanation of the invention and is not meant as a limitation of the invention. For example, features illustrated or described as part of one embodiment can be used with another embodiment to yield still a third embodiment. It is intended that the present invention include these and other modifications and variations.

An apparatus 10 fitted onto a trailer 20 is illustrated with reference to FIG. 1 in which the skirt 18 is located under the trailer 20 and prevents air from hitting the rear wheels of the trailer 20 during travel of the trailer 20. The skirt 18 extends in a longitudinal direction 24 and may be oriented at an angle to the trailer 20 or in some instances may extend in the same direction as the length of trailer 20. The skirt 18 can have any length in the longitudinal direction 24 but generally extends from the rear wheels to the vertical support of the trailer 20. A second skirt (not shown) can be located on the opposite side of the trailer 20 to prevent or direct air flow related to the opposite side. Any number of bending members 14 may be used to support the skirt 18. Brackets can be attached to the top of the skirt 18 and the bottom surface or I-beams 28 of the trailer 20 to in turn attach the skirt 18 to the trailer 20. The opposite skirt (not shown) may likewise have any number of bending members 14 integrated therewith for its support. The skirt 18 can be held to the trailer 20 via only the bending members 14, or can be held onto the trailer 20 via the bending members 14 and additional brackets. Still further, in other embodiments the skirt 18 can be held onto the trailer 20 solely by the brackets and the bending members 14 can be present not to hold the skirt 18 onto the trailer 20 but to instead support the skirt 18 upon deflection and act to push it back into its normal, at-rest position.

The height of the skirt 18 in the vertical direction 26 may be selected so that it is large enough to cover the necessary area of air deflection that is desired, yet small enough so that it is not scraping the ground or otherwise easily hitting the road surface or objects resting on the road surface. It is presumed, however, that in the normal course of driving the skirt 18 will strike objects when the trailer 20 navigates curves, goes over objects, reaches a crown in the road, hits a snowbank, or otherwise engages anything found on roads or in distribution centers.

Figure 2:
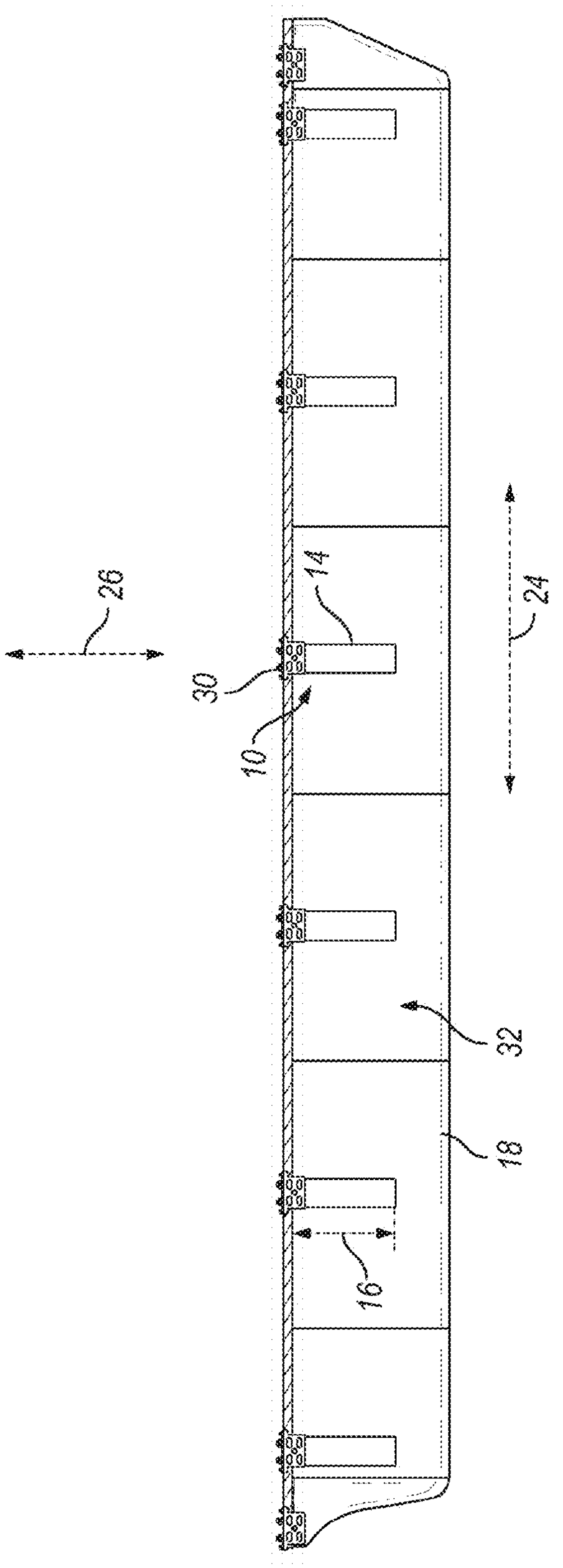
FIG. 2 is a side elevation view of the apparatus including the skirt and bending member.

A back side view of the skirt 18 with the attached bending members 14 of the apparatus 10 is illustrated with reference to FIG. 2. An attachment device 30 is attached to the trailer 20, for example through bolting, and the bending member 14 is attached to the attachment device 30 and extends in the vertical direction 26. The bending members 14 and attachment devices 30 are located at the top of the skirt 18 in the vertical direction 26 and are generally spaced evenly from one another in the longitudinal direction 24. The bending members 14 extend from the top of the skirt 18 downward in the vertical direction 26 but do not extend the entire length of the height of the skirt 18. Instead, the bending members 14 stop short of the bottom of the skirt 18. The skirt 18 may be a single piece member made up of one component or can be multiple components that are attached to one another. In the embodiment in FIG. 2, the skirt 18 is made from a plurality of central panels that are attached to one another to form almost the entire length. A rear trailer skirt panel forms the back end of the skirt 18 and is attached to the tailing central panel. The rear trailer skirt panel has a shape and size different than the central panel to which it is attached. A front trailer skirt panel is located at the front of the skirt 18 and is attached to and shaped and sized differently than the leading central panel.

The bending members 14 may be configured in a variety of manners in accordance with different exemplary embodiments so that they perform the functions of supporting the skirt 18 and allow for bending of the skirt 18 to take place when the skirt 18 engages an object so that force is applied to the skirt 18. The bending member 14 may be elongate, and can be attached to the skirt 18 using any desired mechanism, such as by use of one or more fasteners, weldments, adhesives, clamps, and/or mounting brackets as previously stated. The skirt 18 can be attached to the trailer 20 through brackets, through the bending member 14, or through a combination of brackets and the bending members 14.

The apparatus 10 enables the skirt 18 to snap back into the default position once the obstacle interaction is complete by means of the bending member 14 arranged vertically 26 along the inner surface 32 of the skirt 18. The number of bending members 14 needed depends on the skirt 18 variant being used. The bending members 14 are attached to the skirt 18 and mounted onto the cross I-beams 28 of under the trailer 20. These I-beams 28 are also called “ribs” of the trailer 20. It is to be understood, that the ribs 28 need not be I-beams in other versions of the apparatus 10, but need only be some structural member that is under the floor of the trailer 20 or that makes up the floor of the trailer 20. It is therefore to be understood that the term “rib” is broader than the term “I-beam” because the rib 28 includes I-beams 28 but also includes structure other than just I-beams. The bending member 14 features a shape and design that provides varying stiffness along the length of its body. The toggle location of the bending member 14 as the skirt 18 complies to the obstacle has been designed to provide the required force to bring the skirt 20 back into position. The bending member 14 can spring back to its normal, at rest, position such that if the skirt 18 is deflected inboard in the lateral direction 22 it can spring back, and such that if the skirt 18 is deflected outboard in the lateral direction 22 it can again spring back once the force of deflection is removed.

Figure 3:
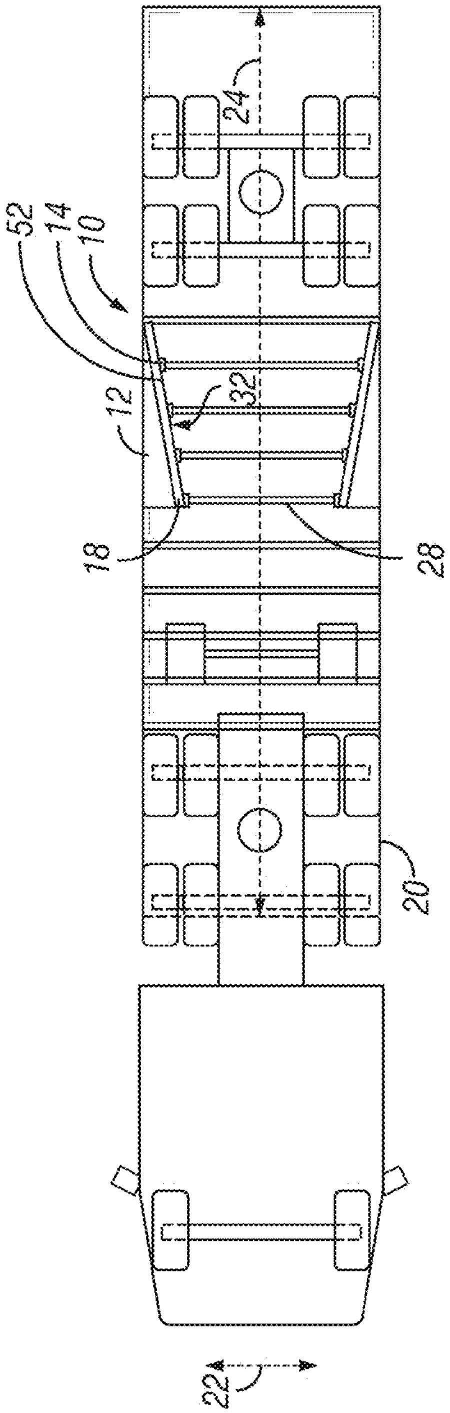
FIG. 3 is a bottom view of a trailer with the apparatus attached showing the position of the rib covers and skirt.

With reference to FIG. 3, the trailer 20 may be constructed so that a plurality of ribs 28 are at the lower surface of the trailer 20. The ribs 28 extend in the lateral direction 22 of the trailer 20 and each one of the ribs 28 is spaced from successive ribs 28 in the longitudinal direction 24. Wind may engage the ribs 28 during travel of the trailer 20 and cause aerodynamic drag or otherwise detract from the aerodynamic properties of the trailer 20. The apparatus 10 includes a rib cover 12 that covers a portion of at least one or more of the ribs 28 in order to minimize or prevent drag on these portions of the ribs 28. The rib cover 12 may engage the ribs 28 or could be spaced therefrom so long as the rib cover 12 minimizes drag associated from wind hitting the ribs 28. The rib cover 12 is integrally formed with the trailer skirt 18 such that these two components 12 and 18 are one piece. The rib cover 12 is positioned so as to be outboard of the trailer skirt 18 in the lateral direction 22. In this regard, the rib cover 12 is outboard in the lateral direction 22 from the outward facing surface of the skirt 18, and this outward facing surface may directly face the rib cover 12. The rib cover 12 may be wedge shaped and can extend along the longitudinal direction 24 such that the rib cover 12 extends the same amount in the longitudinal direction 24 as does the trailer skirt 18.

The entire rib cover 12 can be oriented so that the entire rib cover 12 is completely forward of the bogie assembly in the longitudinal direction 24. Still further, the entire rib cover 12 may be completely rearward of the landing gear in the longitudinal direction 24. The rib cover 12 can be limited to being outboard of the trailer skirts 18 in the lateral direction 22, but there are no rib covers 12 covering any of the ribs 28 at locations inboard from the two trailer skirts 18 in the lateral direction 22. As such, embodiments exist in which the rib covers 12 are present and are all located only outboard of their respective trailer skirts 18 in the lateral direction 22.

Although described and labeled in the figures as a single trailer skirt 18 and a single rib cover 12, it is to be understood that a second trailer skirt 18 and a second rib cover 12 can be located on the opposite side of the trailer 20 in the lateral direction 22 as shown in FIG. 3. The second trailer skirt 18 and rib cover 12 can be arranged in the same manners as previously discussed with respect to the first trailer skirt 18 and rib cover 12, and a repeat of this information is not necessary. The provision of a rib cover 12 allows the trailer skirt 18 to be oriented at an angle that is not completely within the longitudinal direction 24 without increasing drag caused by air flow hitting the ribs 28 that would otherwise occur if the rib cover 12 were not present.

Figure 4:
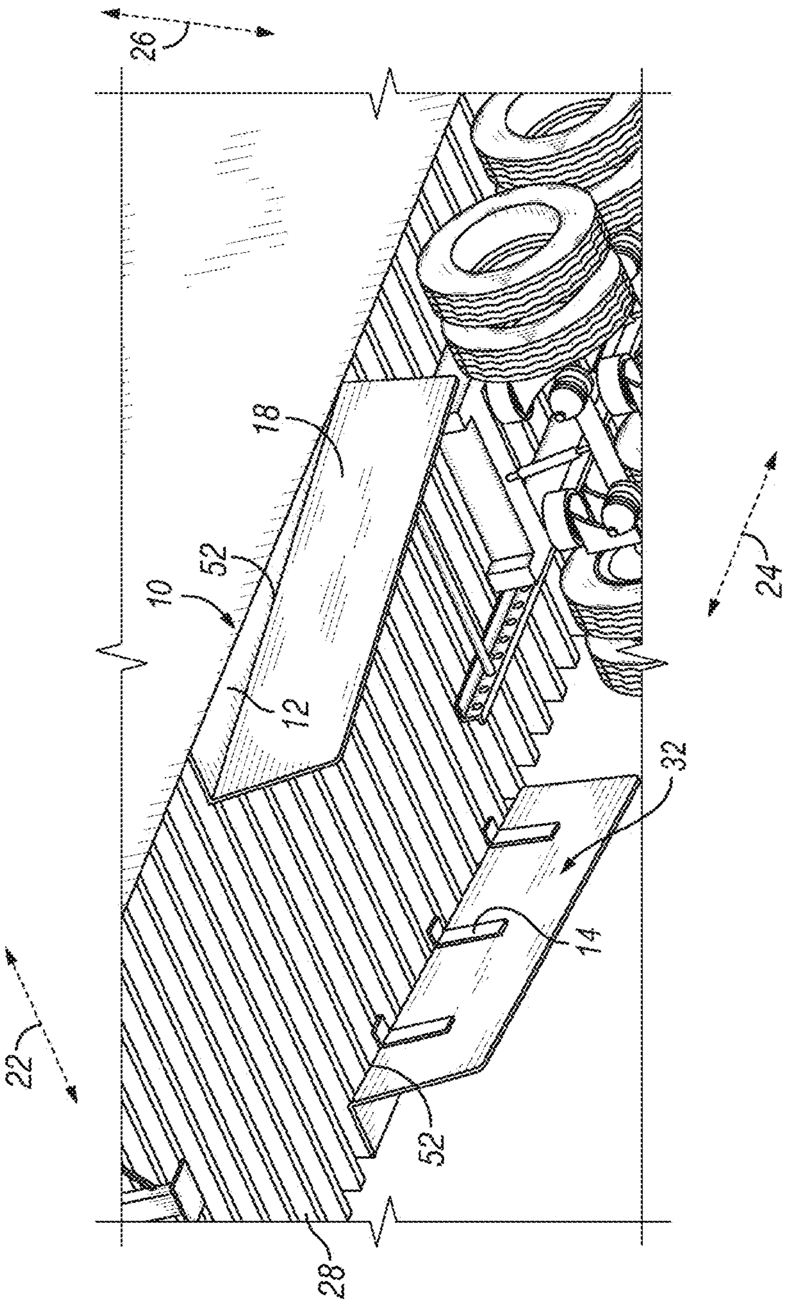
FIG. 4 is a bottom perspective view of a trailer with an attached apparatus that includes a rib cover, skirt, and bending members.

FIG. 4 shows a perspective view of a portion of the trailer 20 from its underside. The rib cover 12 extends to the forward end of the trailer skirt 18, but does not extend forward of the trailer skirt 18 in the longitudinal direction 24. Although shown as being completely outboard of the trailer skirt 18, the rib cover 12 could extend inboard from the trailer skirt 18 in the lateral direction 22 as well in other embodiments. The ribs 28 between the two trailer skirts 18 at the same longitudinal locations in the longitudinal direction 24 are not covered by the rib covers 12.

Figure 5:
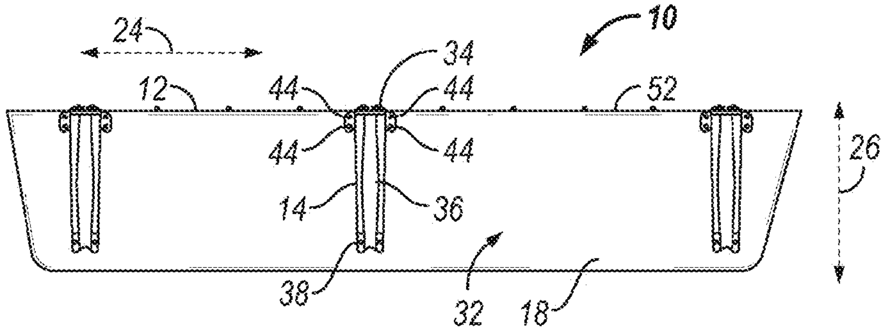
FIG. 5 is a side view of an apparatus in accordance with another exemplary embodiment.
Figure 6:
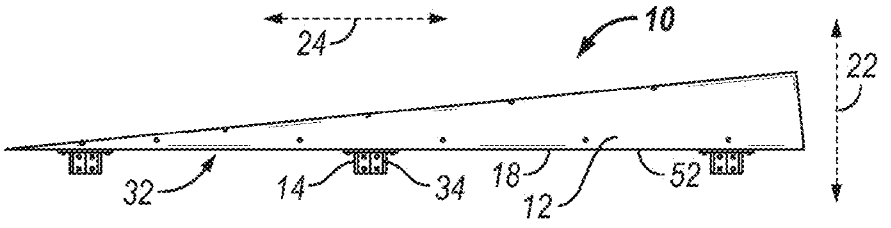
FIG. 6 is a top view of the apparatus of FIG. 5.
Figure 7:
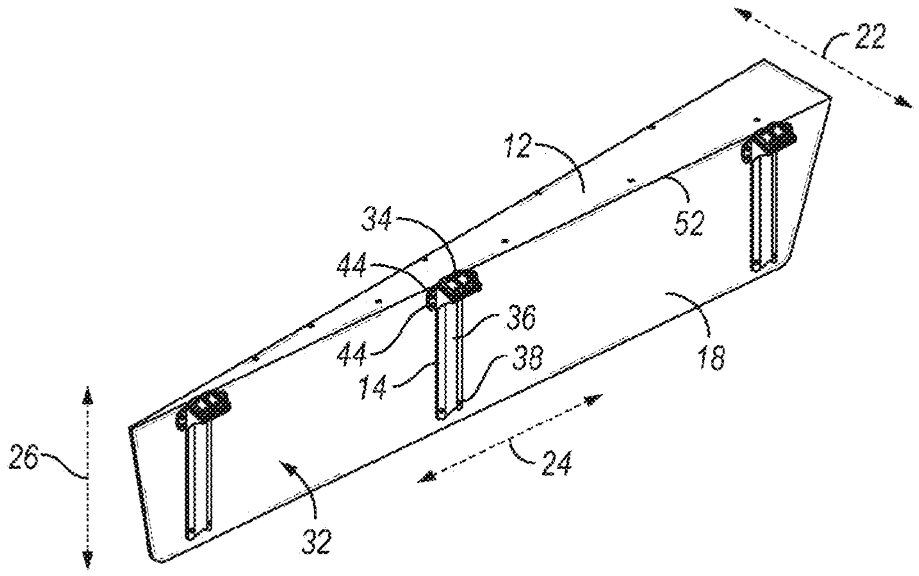
FIG. 7 is a perspective view of the apparatus of FIG. 5.

FIGS. 5-7 shows an embodiment of the apparatus 10 that includes the rib cover 12, bending members 14, and skirt 18. Although three bending members 14 are shown, any number could be present in other embodiments. The bending member 14 has a top portion 34 with a middle portion 36 extending downward in the vertical direction 26, and a bottom portion 38 at the end of the middle portion 36. The rib cover 12 is bent such that is has a planar surface with a surface normal that extends in the vertical direction 26, and a 90 degree oriented surface that has a surface normal that extends in the lateral direction 22. The bending member 14 engages both the skirt 18 and is spaced from and free from engagement with the rib cover 12. The top portion 34 and bottom portion 38 engage the skirt 18, but do not engage the rib cover 12. The middle portion 36 may be a section of the bending member 14 that deflects when the skirt 18 is deflected. The top portion 34 may be a portion of the bending member 14 that does not deflect upon deflection of the bending member 14. The bend 52 that is the boundary between the skirt 18 and rib cover 12 may engage the bending member 14, and in particular may engage the top portion 34.

Figure 8:
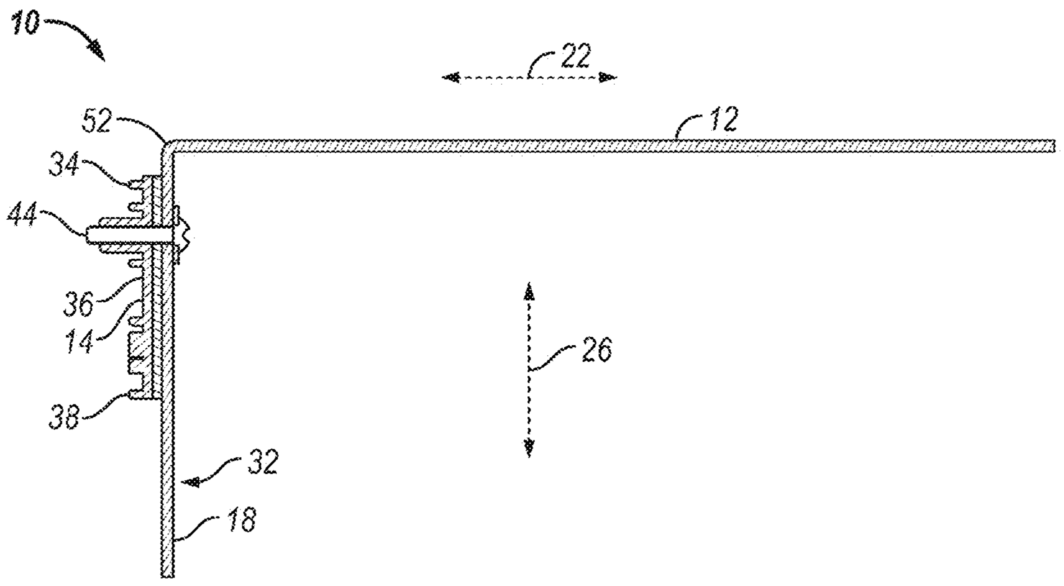
FIG. 8 is a cross-sectional view of an apparatus in accordance with another exemplary embodiment.

FIG. 8 shows a similar apparatus 10 as previously discussed, but with a differently configured bending member 14. The bending member 14 features a top portion 34, middle portion 36, and bottom portion 38, and the bending member 14 engages the skirt 18, but does not engage the rib cover 12. Further, the bending member 14 is free from engagement with the bend 52. As shown, the rib cover 12 is planar, and can have a wedge shape. A bolt 44, which could be multiple bolts 44 in other embodiments, extends through the skirt 18 to cause the skirt 18, rib cover 12, and bending member 14 to be fixed together. In other arrangements, the apparatus 10 can be as shown and described, but the bending member 14 can extend downward farther in the vertical direction 26 and may or may not be attached to and/or engaged with the skirt 18.

Figure 9:
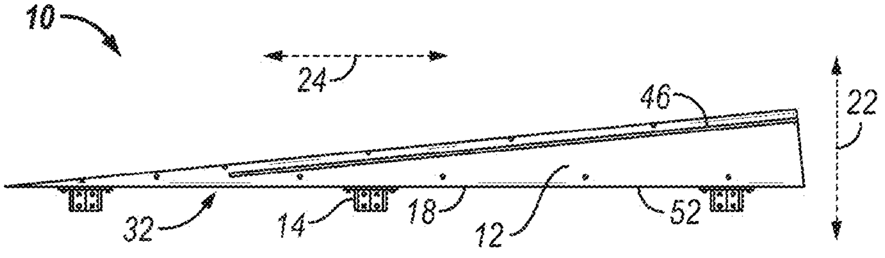
FIG. 9 is a top view of an apparatus with a rib cover with a strength feature.

Another embodiment of the apparatus 10 is shown in FIG. 9. The apparatus 10 is configured the same as previously discussed with respect to the FIGS. 5-8 embodiments, but also includes a strength feature 46 located on the planar surface that has a surface normal that extends in the vertical direction 26. FIG. 9 shows this strength feature 46 on the upper surface of the rib cover 12, and there is no strength feature 46 on the skirt 18. The strength feature 46 that is on the planar surface of the rib cover 12 functions to increase the strength of the rib cover 12 to further reduce fluttering or vibrations and extend the life of the apparatus 10.

Figure 10:
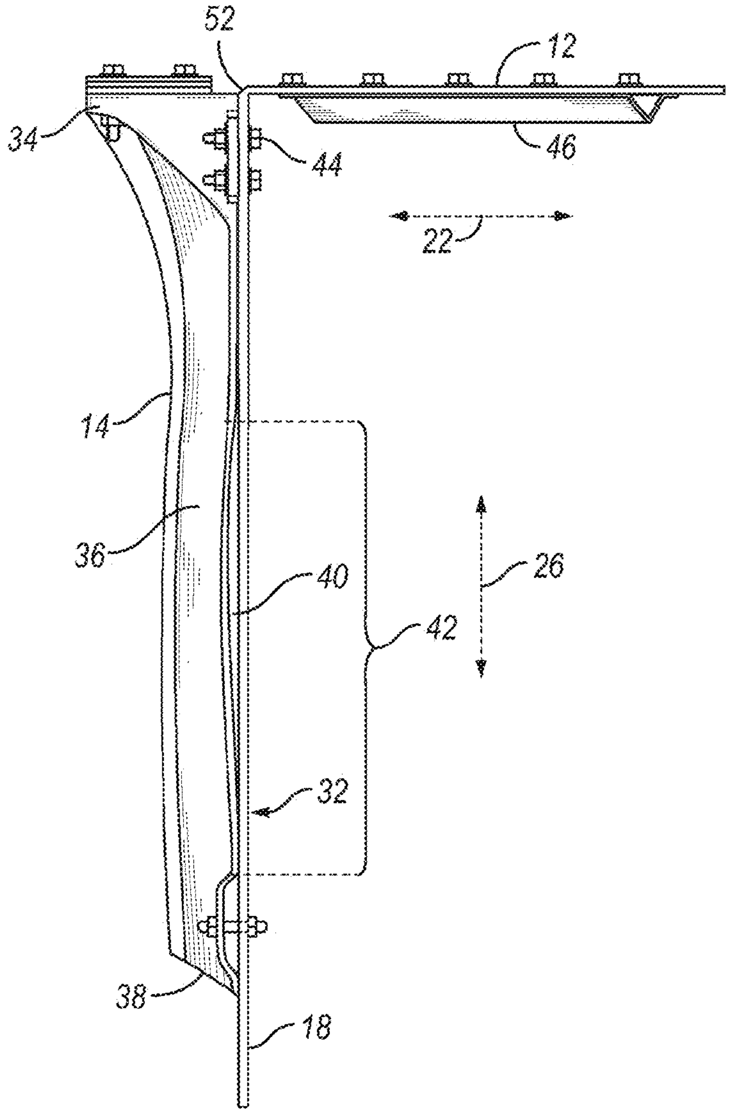
FIG. 10 is a side view of an apparatus that has a rib cover with a strength feature in accordance with another exemplary embodiment.

FIG. 10 is another embodiment of the apparatus 10 that shows these components with the bending members 14 attached. The planar sections of the rib cover 12 can both be sheets of a single thickness. The strength feature 46 in this embodiment is additional material that extends in a linear direction parallel to the edge of the rib cover 12, and with components of extension in both the lateral direction 22 and longitudinal direction 24. The strength feature 46 can have a rectangular cross-sectional shape, or can have any cross-sectional shape in other embodiments. The strength feature 46 increases the strength of the planar portion of the rib cover 12 to which it is attached. The strength feature 46 may face downward or upward in the vertical direction 26, and in some embodiments there could be strength features 46 located on both sides of the rib cover 12 in the vertical direction 26. The strength feature 46 does not extend along the entire length of the rib cover 12 in the longitudinal direction 24, and does not extend along the entire length of the rib cover 12 in the lateral direction 22. In FIG. 10 the strength feature 46 is located on the lower planar surface of the rib cover 12 and is lower in the vertical direction 26 than is the rest of the rib cover 12 that makes up the planar portions. The strength feature 46 here is a V-shaped member that has an opening in its center through which air may flow during movement of the trailer 20. The strength feature 46 is configured to minimize any aerodynamic disruption through its presence on the rib cover 12.

Figure 11:
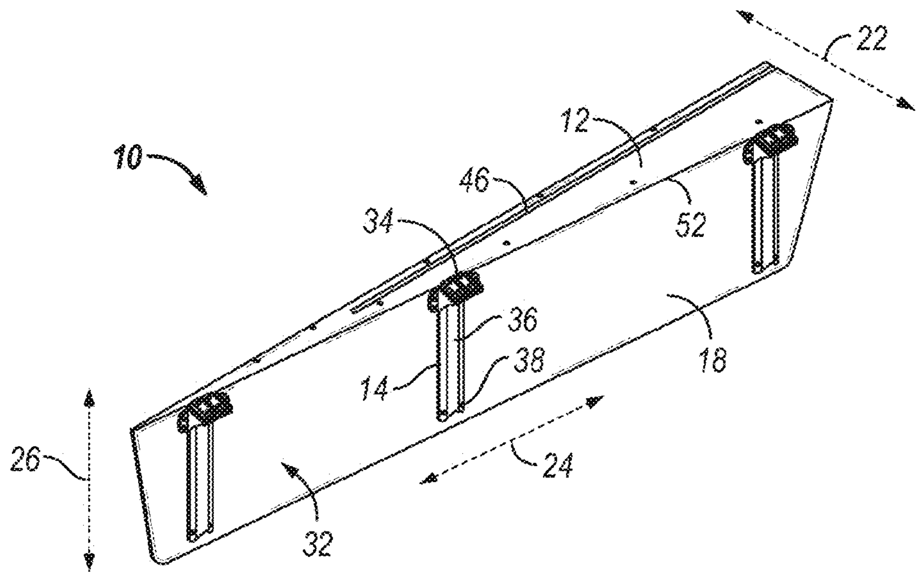
FIG. 11 is a perspective view of an apparatus with a rib cover that has a strength feature in accordance with another exemplary embodiment.

FIG. 11 shows another embodiment of the apparatus 10 that includes a rib cover 12 with a strength feature 46, and a bending member 14 supporting the skirt 18. The strength feature 46 extends to one terminal end of the rib cover 12 in the longitudinal direction 24, but does not extend all the way to the opposite terminal end in the longitudinal direction 24. The strength feature 46 is spaced from both terminal ends of the rib cover 12 in the lateral direction 22. The strength feature 46 extends in a length that is parallel to the outboard most terminal edge of the rib cover 12 in the lateral direction 22.

Figure 12:
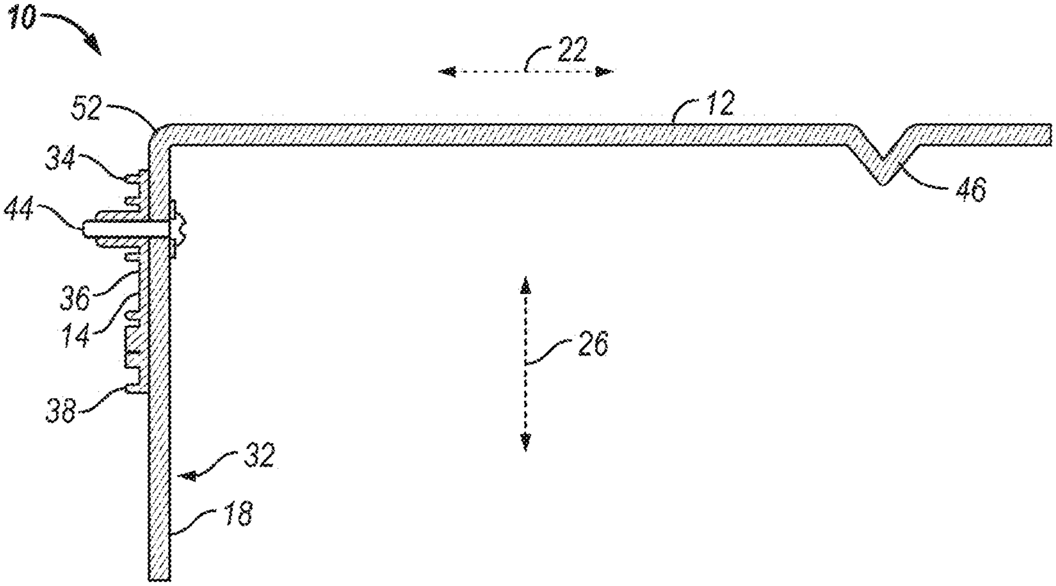
FIG. 12 is a cross-sectional view of an apparatus with a rib cover with strength feature in accordance with yet another exemplary embodiment.

FIG. 12 shows the strength feature 46 on a different apparatus 10. The strength feature 46 here has a V-shaped cross section and is located on a planar surface of the rib cover 12 that has a surface normal that extends in the vertical direction 26. The strength feature 46 has a point of the V-shape that is located on a surface of the rib cover 12 that faces downward in the vertical direction 26. The strength feature 46 has an open center that is triangular in shape to allow wind to flow through the strength feature 46 during movement of the trailer 20. Wind may engage the strength feature 46, but the strength feature 46 is shaped to minimize any aerodynamic loss in the system. The rib cover 12 is integrally formed with the skirt 18, but in this embodiment, the skirt 18 is thicker than the rib cover 12 such that the skirt 18 and rib cover 12 do not have the same thickness as one another. The bend 52 demarcates the boundary between the thinner and thicker sections of the skirt 18/rib cover 12 combination.

The strength feature 46 in this embodiment is not a separate component that is attached to the rib cover 12, but is instead a feature imparted into the rib cover 12 to increase its strength. The strength feature 46 can be bent into the rib cover 12 and thus integrally formed with the rib cover 12. The rib cover 12 may be a single sheet of material, or a composite material such that it is formed into a planar surface. The strength feature 46 can be a bend into this planar surface, and the bend functions to increase stiffness of the resulting rib cover 12. The bend may be V-shaped as shown, or could be variously shaped in other embodiments. With this strength feature 46, no additional materials are needed to be added or attached to the rib cover 12. The strength feature 46 does not extend along the entire length of the rib cover 12 in the lateral direction 22 or the longitudinal direction 24. The shape of the strength feature 46 may be selected so as to minimize any aerodynamic impact that could be caused by a discontinuity in the shape of the rib cover 12. The point of the V of the strength feature 46 is located downwards in the vertical direction 26 such that it directly faces the inner surface 32. The opened part of the V of the strength feature 46 would directly face the ribs 28.

Figure 13:
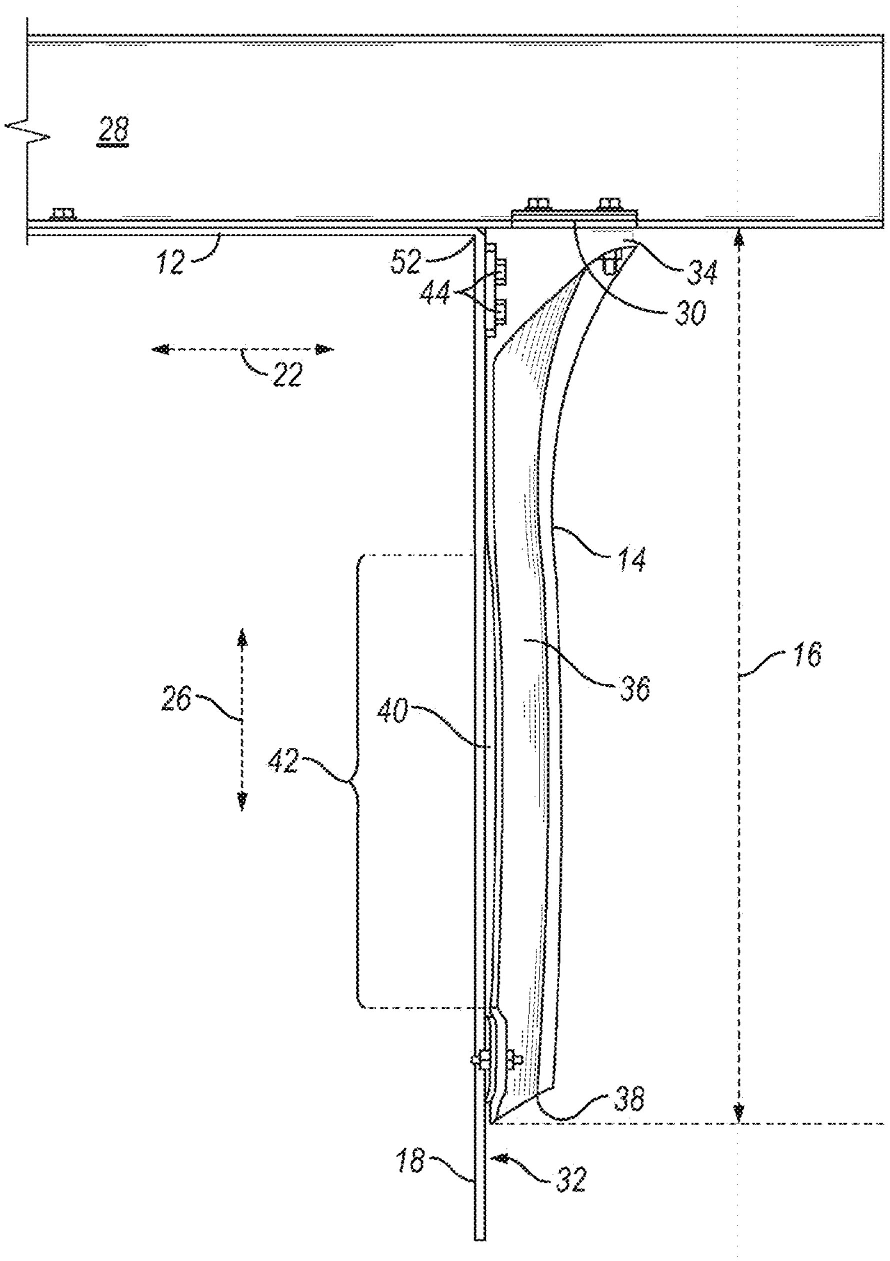
FIG. 13 is a front view of an apparatus attached to an I-beam of the trailer that features a bending member with a non-parallel section to an inner surface of the skirt.
Figure 14:
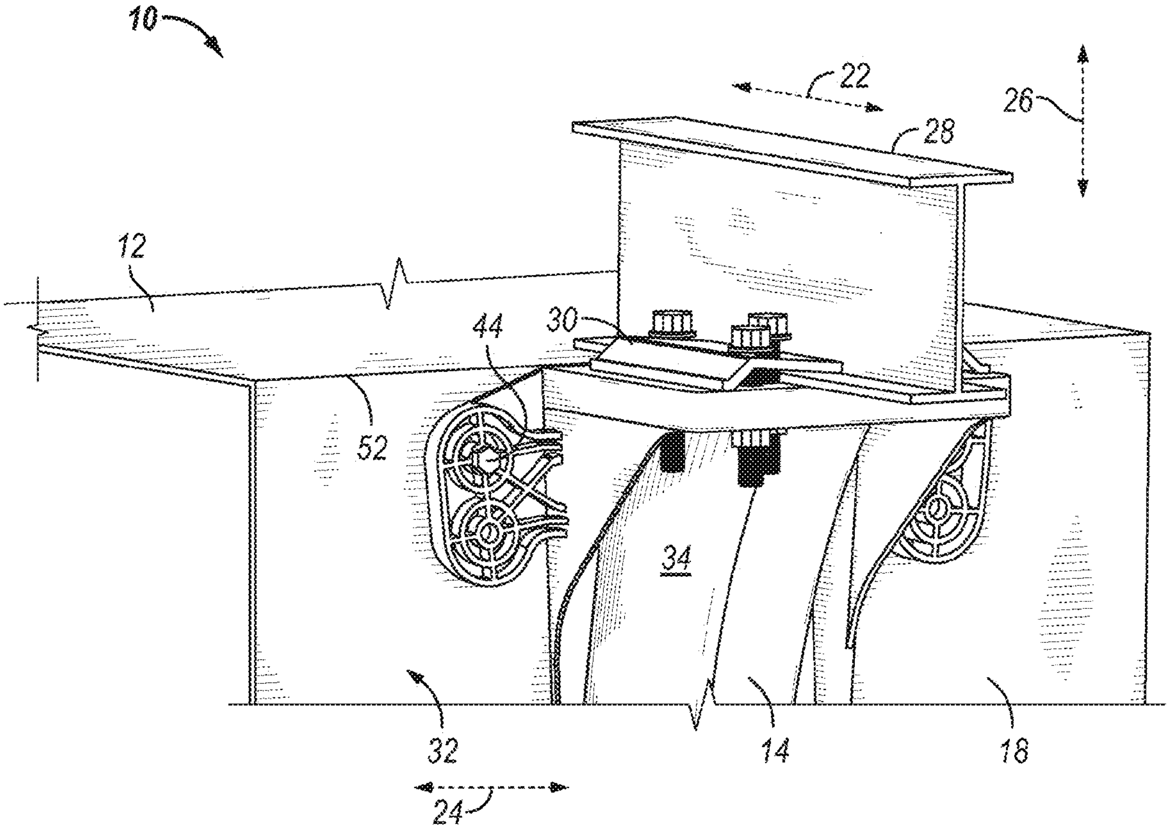
FIG. 14 is a perspective view of a portion of an apparatus with an attachment device used to connect the bending member to the bottom flange of an I-beam.
Figure 15:
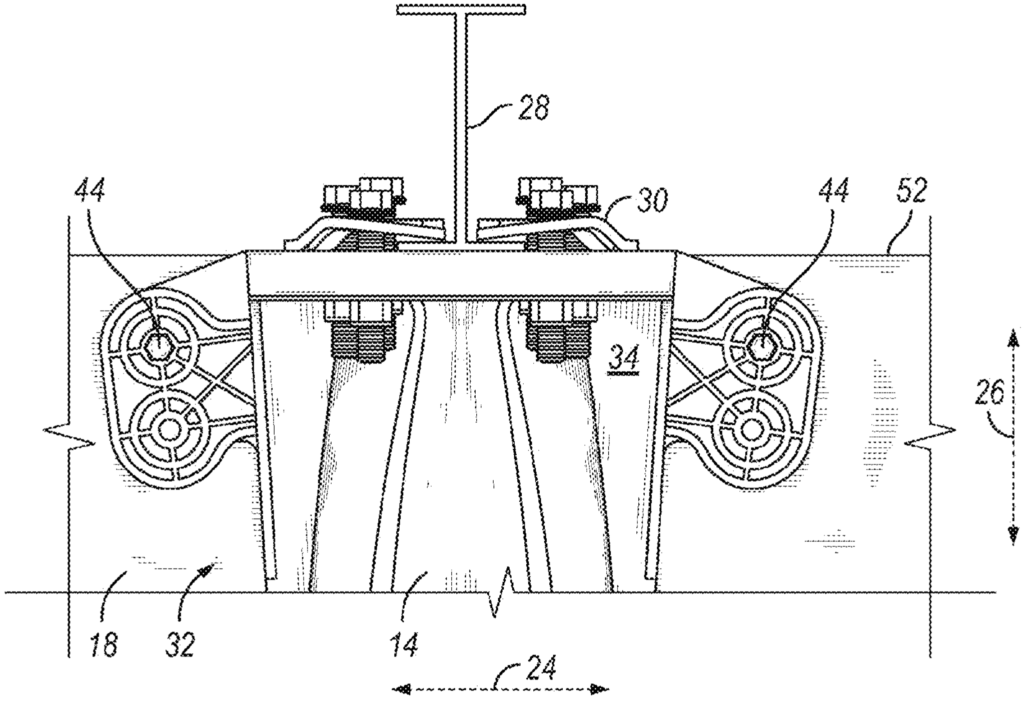
FIG. 15 is a side view of FIG. 14.

FIGS. 13-15 disclose another embodiment of the apparatus 10 as attached to a rib 28 that is an I-beam 28 of the trailer 20. A curved profile of the bending member 14 in some embodiments makes it unique to other products in the market that offer the same function. The bending member 14 is thus arranged so that it is not parallel to the inner surface 32, thereby making the bending member 14 neither a vertical, substantially parallel bending member nor a strut. The bending member 14 can be made stiff enough to support the skirt 18 during vehicle operating conditions for wind loads, but providing support against the tendency of the skirt 18 to flutter at certain vehicle speeds.

The bending member 14 is non-parallel to the inner surface 32, and this non-parallel feature can be expressed in terms of the vertical length 16 of the bending member 14. The vertical length 16 is the length of the bending member 14 in the vertical direction 26 during the normal, at rest position with no deflection of skirt 18. The bending member 14 is non-parallel in that at least 30% of the vertical length 16 does not have any surface area that is parallel to the inner surface 32. Some of the vertical length 16 may have some surface area that is parallel to the inner surface 32, but at least 30% of the vertical length 16 is oriented at a non-parallel position to the inner surface 32. In other embodiments, at least 50% of the vertical length 16 does not have any surface area that is parallel to the inner surface 32. In other embodiments, at least 90%, at least 80%, at least 70%, at least 60%, or at least 40% of the vertical length 16 is oriented at a non-parallel position to the inner surface 32 such that it has no surface that is parallel to the inner surface 32. These various percentages can be calculated as a percentage of the total vertical length 16, and the length of the bending member 14 having no parallel surfaces to the inner surface 32 can be a continuous length that makes up the percentage, or can be two or more sections of length that when added together make up the percentage.

The bending member 14 is attached to the skirt 18 and a space 40 is defined between the inner surface 32 and the bending member 14, specifically at a non-parallel section 42 of the bending member 14. The non-parallel section 42 is a length of the bending member 14 that does not have any surface area that is parallel to the inner surface 32. The length of the non-parallel section 42 can be any one of the percentages of the vertical length 16 as previously discussed. Although a single non-parallel section 42 is shown, other sections of the bending member 14 may likewise have no surfaces that are parallel to inner surface 32. The bending member 14 is arranged so that it has a single curved section 42, and flat/parallel portions in the top portion 34 and the bottom portion 38. As in other embodiments, the rib cover 12 is angled and a bend 52 separates the rib cover 12 from the integrally formed skirt 18. The planar surfaces of the rib cover 12 and skirt 18 may be oriented at a 90 degree angle to one another, or their orientation may be at a different angle in other exemplary embodiments.

An attachment device 30 engages both the top portion 34 and the bottom flange of the rib 28. Bolts can be inserted through the apertures of the top portion 34 and through the attachment device 30 to fix the attachment device 30 to the top portion 34. Tightening of the bolts causes the attachment device 30 to clamp down onto the bottom flange of the rib 28 to cause the bending member 14 to be secured to the rib 28. The bolts that tighten the attachment device 30 may or may not engage the rib 28. The disclosed attachment arrangement is only exemplary, and other various types of attachment of the bending member 14 to the rib 28 or other part of the trailer 20 can be used in other embodiments.

The top portion 34 is also shown attached to the skirt 18 via the bolts 44, and the top portion 34 in this area engages the inner surface 32. The bolts that tighten the attachment device 30 do not engage the rib 28. The bottom portion 38 has some planar surfaces that are parallel to the inner surface 32. The portion of the bottom portion 38 that defines the slots into which the bolts or members in the skirt 18 may ride have planar portions that are parallel to the inner surface 32. These planar portions are on both sides of the bottom portion 38 in the lateral direction 22, both those directly facing the inner surface 32 and those facing directly away from the inner surface 32. In other embodiments, the portions of the bottom portion 38 that define the slots can be curved in their entirety such that no portion of the bottom portion 38 has a surface that is parallel to the inner surface 32.

Although the bottom portion 38 is shown as having some surfaces that are parallel to the inner surface 32, in other embodiments the bending member 14 can be arranged so that no portion of the bottom portion 38 has a surface parallel to the inner surface 32. In addition, no surface area of the middle portion 36 may be parallel to the inner surface 32 in some embodiments, and in these instances the only section of the bending member 14 that has any surface parallel to the inner surface 32 is in the top portion 34.

Any number of bolts 44 can be present to fix the bending member 14 to the skirt 18 and consequently to the rib cover 12. Further, although the connection between the bending member 14 at the bottom portion 38 and the skirt 18 is shown as a sliding connection, it need not be sliding in other embodiments. In yet further embodiments the bending member 14 need not be attached to the skirt 18 at the bottom portion.

Figure 17:
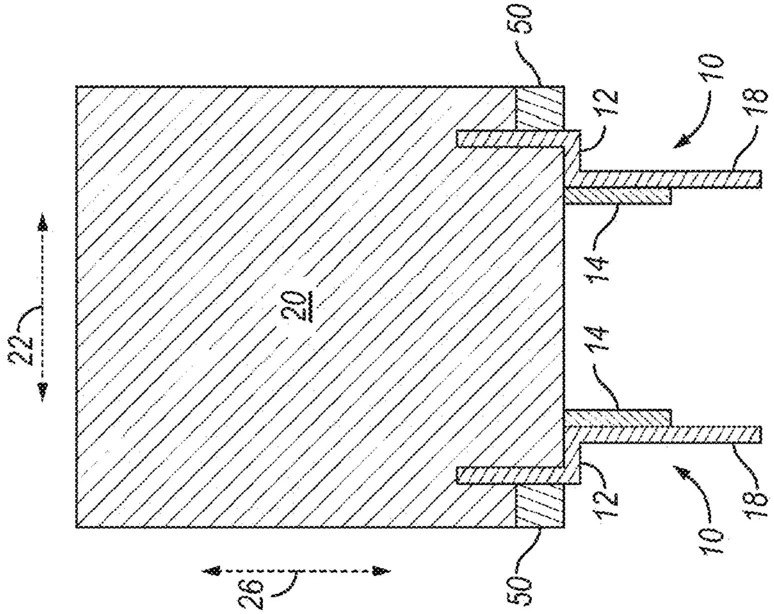
FIG. 17 is a front cross-sectional view of a trailer with a rib cover located inboard of the side edge and attached to a side rail of the trailer.
Figure 16:
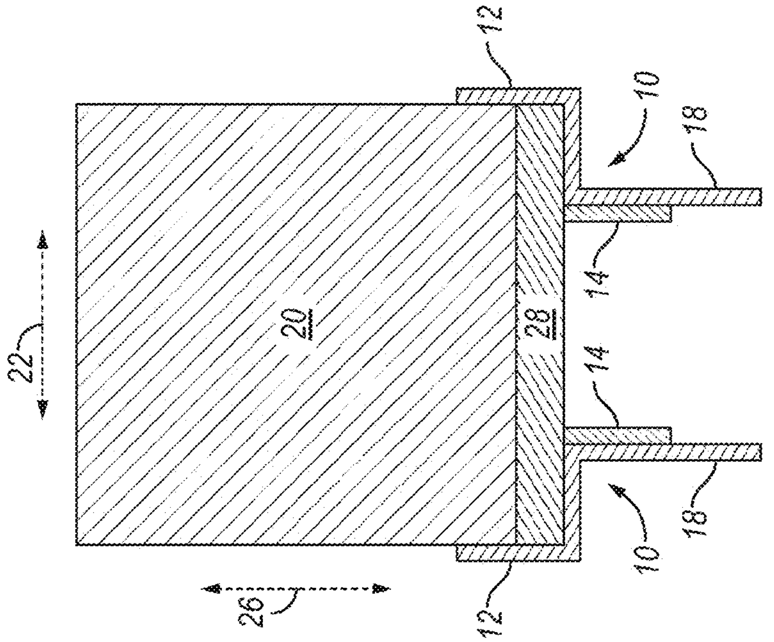
FIG. 16 is a front cross-sectional view of a trailer that has a rib cover that is laterally outboard of a side surface of the trailer.

Another arrangement of the apparatus 10 is shown in FIG. 16 that is a front cross-sectional view of the trailer 20. The rib cover 12 is different in that it extends in the lateral direction 22 outboard of the side edge of the trailer 20 and is attached to or otherwise engages the side surface of the trailer 20. This portion of the rib cover 12 need not engage the ribs 28. This flange of the rib cover 12 bends down under the bottom of the ribs 28 and may engage the ribs 28 or otherwise be attached to them. The skirt 18 is integrally formed with the rib cover 12 and engages the bending member 14. The rib cover 12 can extend outward of the side edge of the trailer 20 in the lateral direction 22. FIG. 17 shows another embodiment in which the positioning of the rib cover 12 is located inboard of the side edge of the trailer 20 in the lateral direction 22. In this regard, the rib cover 12 does not extend to the side edge of the trailer 20 in the lateral direction 22 and is spaced a distance inboard therefrom. The rib cover 12 may extend in the vertical direction 26 so that a portion of the rib cover 12 is located vertically higher than a portion of the trailer 20. The rib cover 12 is attached to a side rail 50 of the trailer 20 and secured thereto. The rib cover 12 may or may not be attached to the ribs 28 in this arrangement, and may or may not engage the ribs 28. It is to be understood that the rib cover 12 can be attached to any portion of the trailer 20 in accordance with various exemplary embodiments.

The integral formation of the rib cover 12 and skirt 18 simplifies the method of attachment of the skirt 18 to the trailer 20 because the shape and presence of the rib cover 12 acts as a guide as to where the skirt 18 should be positioned. In many instances, the skirt 18 is angled or curved relative to the longitudinal direction 24, and the integrally formed rib cover 12 can have an edge aligned completely in the longitudinal direction 24, consequently causing the integral skirt 18 to be correctly positioned on the trailer 20. Attachment of the forward end of the skirt 18, and then bending or otherwise angling the skirt 18 to the desired location can be avoided with the rib cover 12 and skirt 18 configuration presented herein.

Although described in previous embodiments as being attached to the trailer 20 via the bending member 14, the rib cover 12 and skirt 18 piece may be attached via rivets along the length of these members. In this regard, the rib cover 12 and skirt 18 combination are attached to the trailer 20 via rivets or other mechanical fasteners through the rib cover 12 and into the ribs 28 or other trailer 20 components. In other embodiments, brackets or other mechanical fasteners can attach the skirt 18 to the ribs 28 or other trailer 20 components. The bending members 14 can also function to attach the skirt 18 and rib cover 12 to the trailer 20, or the bending member 14 may not be attached to the skirt 18 or rib cover 12 and thus may not function to attach these components to the trailer 20. The rib cover 12 can be made of the same or different material from the skirt 18. In this regard, variations of thermoplasts, composites, or thermosets can be used for the skirt 18 and rib cover 12. However, the skirt 18 and rib cover 12 are still provided as one piece with the bend 52 between them.

The addition of the rib cover 12 provides structural support to the skirt 18 attachment and aids in dampening high frequency low amplitude vibration events of the skirt 18 during operation. This configuration improves the life of the system and reduces wear during normal and extreme operations. The rib cover 12 is attached to the underside of the trailer 20 and mounted on the cross members that make up the ribs 28. This improves the aerodynamic performance at the underside of the trailer 20 by reducing low pressure regions along with providing an added rigidity to the skirt 18 at the trailer 20 attachment region which helps preserve the laminar air low around the trailer 20 and results in fuel savings. Another aspect of the rib cover 12 is that it acts as a positioning reference for the skirt 18 to achieve the desired skirt 18 profile for the aerodynamic performance required by improving the airflow under the cross member and closing up the space between them. To achieve easier installation of the skirt panel 18 onto the trailer 20, the rib cover 12 first sets up the alignment of the skirt 18 with respect to the trailer 20 edge and also defines the proximity of the leading edge of the skirt 18 to the trailer 20 during pre-assembly. The integrally formed skirt 18 will be properly positioned due to the correct positioning of the rib cover 12.

In selecting materials and configurations of the skirt 18 and rib cover 12, the skirt 18 could be thinner to achieve more flexibility and the rib cover 12 could be thicker to provide added stiffness or rigidity for mounting. This tuning of the system can translate into cost gains as a result of having the flexibility to choose different materials and/or sizes. An additional feature of the rib cover 12 is that it acts as a bridge with the integrally formed skirt 18 under the trailer 20 in cases where the ribs 28 are of different heights. This helps maintain the required stiffness properties regardless of offsets in heights of the ribs 28. The provided design of the rib cover 20 functions as an assembly aid, a structural member for the skirt 18, a structural member for the bending member 18, and a bridge for the bending members 18 in the case of misaligned cross member beams 28.

The rib cover 12 and skirt 18 are integrally formed with one another, and are a single piece and not two pieces formed separately and subsequently attached to one another. The rib cover 12 and skirt 18 can be molded as a single piece and then bent to form the bend 52 and achieve the desired profile and functionality when attached to the trailer 20. The strength feature 46, if present may be integrally formed with the rib cover 12 such that the strength feature 46, rib cover 12, and skirt 18 are all one piece. Alternatively, the rib cover 12 and skirt 18 can be one piece, while the strength feature 46 is a separate piece that is first formed and then subsequently attached to the rib cover 12. Formation of the rib cover 12 and skirt 18 as one initial piece eliminates the need to attach them to one another, which would be one or more extra assembly steps. The formation of the bend 52 could be made after molding the rib cover 12 and skirt 18 as two planar pieces, or the formation of the bend 52 can be eliminated as an assembly step in the instances in which the skirt 18 and rib cover 12 are molded together with the bend 52 being present.

As used herein, the description of the rib cover 12 and skirt 18 as being integrally formed with one another means that they are formed as a single piece that is continuous, and are not two separately formed pieces that are subsequently attached to one another. There is no discontinuity in the material making up the rib cover 12 and skirt 18, and the bend 52 is not a discontinuity but instead the material is continuous from the rib cover 12 over the bend 52 to the skirt 18. The rib cover 12 and skirt 18 can be made of the same material that is continuous across the bend 52 so that a discontinuity in the material is not present. This would be distinguished from a design in which a separate rib cover 12 and skirt 18 were made of the same material and pushed up against one another and attached, which would include material missing at the joint between the rib cover 12 and skirt 18. Although described as being of the same material, the rib cover 12 and skirt 18 could be made of different materials in other embodiments so long as they are formed together and are not first formed and then subsequently attached to one another. The rib cover 12 and skirt 18 could be of different thickness, but may be of the same material and one piece. Further, the rib cover 12 could be of a different material and thickness than the skirt 18, but these parts 12 and 18 are still integrally formed with one another and are manufactured as one piece and are not separate components. Multiple processes of formation of the rib cover 12 and skirt 18 are possible such as molding, 3D printing, extrusion, casting, forging, stamping, injection molding. There need not be any extra fasteners or interlocking pieces of the rib cover 12 and skirt 18 to connect the skirt 18 and rib cover 12.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

We claim:

1. An apparatus, comprising:

a skirt that extends in a longitudinal direction, wherein the skirt has an inner surface;

a rib cover that engages the skirt, wherein the skirt and the rib cover are integrally formed with one another, and wherein the skirt has a height in a vertical direction that is taller than a height of the rib cover in the vertical direction; and a bending member that is configured for being deflected from an at rest position upon application of force to the skirt, and wherein the bending member is configured for returning on its own to the at rest position upon removal of the force from the skirt.

2. The apparatus as set forth in claim 1, wherein a bend is present between the skirt and the rib cover such that the rib cover has a lower surface that is oriented at a ninety degree angle to the inner surface of the skirt.

3. The apparatus as set forth in claim 2, wherein the bend engages the bending member.

4. The apparatus as set forth in claim 2, wherein the bend is free from engagement with the bending member.

5. The apparatus as set forth in claim 1, wherein the rib cover has an upper surface that is planar that has a surface normal that extends in the vertical direction, wherein the rib cover has a strength feature located on the upper surface that increases a strength of the rib cover.

6. The apparatus as set forth in claim 1, wherein the rib cover has a lower surface that is planar that has a surface normal that extends in the vertical direction, wherein the rib cover has a strength feature located on the lower surface that increases a strength of the rib cover, wherein the strength feature has a V-shape with an opening through a center of the V-shape configured for having air flow therethrough.

7. The apparatus as set forth in claim 1, wherein the rib cover has a strength feature on a planar surface of the rib cover that increases a strength of the rib cover, wherein the strength feature is located at a terminal longitudinal end of the rib cover and extends in the longitudinal direction stopping short of and not extending along an entire length of the rib cover in the longitudinal direction; and wherein the strength feature is spaced from and not in engagement with any lateral terminal ends of the rib cover in a lateral direction.

8. The apparatus as set forth in claim 1, wherein the rib cover has a strength feature that increases a strength of the rib cover, wherein the strength feature extends in a direction parallel to an edge of the rib cover.

9. The apparatus as set forth in claim 1, wherein the rib cover has a strength feature that increases the strength of the rib cover, wherein the strength feature is integrally formed with the rib cover and has a thickness that is the same as other portions of the rib cover.

10. The apparatus as set forth in claim 1, wherein the skirt and the rib cover have the same thickness as one another and are made of the same material as one another.

11. The apparatus as set forth in claim 1, wherein the rib cover has a thickness that is greater than a thickness of the skirt, and wherein the skirt and the rib cover are made of the same material as one another.

12. The apparatus as set forth in claim 1, wherein the rib cover is attached to a trailer and extends in a lateral direction so as to be outboard of a side edge of the trailer in the lateral direction.

13. The apparatus as set forth in claim 1, wherein the rib cover is attached to a trailer and is spaced inboard from and does not extend to a side edge of the trailer in a lateral direction, wherein the rib cover extends in the vertical direction so that a portion of the rib cover is located higher than a portion of the trailer in the vertical direction.

14. The apparatus as set forth in claim 1, further comprising an attachment device that attaches the bending member to an I-beam of a trailer; and wherein the bending member defines a slot, and wherein the skirt has a skirt bolt that is rigidly attached to the skirt and that is disposed through the slot, wherein the skirt bolt moves along the slot during bending of the bending member and the skirt.

* * * * *